US012192377B2

(12) United States Patent
Jacobson et al.

(10) Patent No.: US 12,192,377 B2
(45) Date of Patent: Jan. 7, 2025

(54) SECURE NETWORK COMMUNICATIONS THAT LIMIT INFORMATION ACCESS

(71) Applicant: Google LLC, Mountain View, CA (US)

(72) Inventors: Alex Daniel Jacobson, Mountain View, CA (US); Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 211 days.

(21) Appl. No.: 17/916,194

(22) PCT Filed: Dec. 15, 2021

(86) PCT No.: PCT/US2021/063477
§ 371 (c)(1),
(2) Date: Sep. 30, 2022

(87) PCT Pub. No.: WO2022/154923
PCT Pub. Date: Jul. 21, 2022

(65) Prior Publication Data
US 2023/0141428 A1  May 11, 2023

(30) Foreign Application Priority Data
Jan. 12, 2021  (IL) .......................... 280116

(51) Int. Cl.
H04L 9/32   (2006.01)
H04L 9/08   (2006.01)

(52) U.S. Cl.
CPC .......... H04L 9/3247 (2013.01); H04L 9/0825 (2013.01); H04L 9/3297 (2013.01)

(58) Field of Classification Search
CPC ... H04L 9/3247; H04L 9/0825; H04L 9/3297; G06F 21/10; G06F 21/30; G06F 21/60
See application file for complete search history.

(56) References Cited

U.S. PATENT DOCUMENTS 7,716,077 B1 *  5/2010  Mikurak ............ G06Q 10/0631
                                                      705/7.12
8,468,244 B2 *  6/2013  Redlich .................. G06Q 50/18
                                                       715/255

(Continued)

FOREIGN PATENT DOCUMENTS

CN      111684448         9/2020
JP      2013-218575       10/2013

(Continued)

OTHER PUBLICATIONS

Office Action in Israel Appln. No. 280116, dated Jun. 11, 2023, 4 pages.

(Continued)

Primary Examiner — Hosuk Song
(74) Attorney, Agent, or Firm — Fish & Richardson P.C.

(57) ABSTRACT

This disclosure describes systems and techniques for using controlling access to user information using ephemeral user identifiers. In one aspect, a method includes determining, for a given domain, engagement by a user with content provided by the given domain for display by an application at a client device of the user. A determination is made, based on the engagement by the user, to extend, for the given domain, a linkage between user identifiers for a user of the application. In response to determining to extend, for the given domain, the linkage between the user identifiers for the user of the application, one or more future domain-specific ephemeral user identifiers for the user and the given domain are obtained. An attestation record that includes a current domain-specific ephemeral user identifier and the one or more is generated and sent to the given domain.

20 Claims, 4 Drawing Sheets

(56) References Cited

U.S. PATENT DOCUMENTS

| | | | | |
|---|---|---|---|---|
| 9,111,098 | B2* | 8/2015 | Smith | G06F 11/3688 |
| 10,453,319 | B2* | 10/2019 | Jarvis | G07C 9/257 |
| 11,757,662 | B2* | 9/2023 | Le Saint | H04L 9/3271 |
| | | | | 713/171 |
| 11,882,118 | B2* | 1/2024 | Larson | H04L 63/0861 |
| 11,936,772 | B1* | 3/2024 | Kumar | H04L 63/0853 |
| 11,936,942 | B2* | 3/2024 | Bastable | H04N 21/4405 |
| 11,995,194 | B1* | 5/2024 | Shea | H04L 9/0822 |
| 2010/0325441 | A1 | 12/2010 | Laurie et al. | |
| 2014/0359782 | A1 | 12/2014 | Golic | |
| 2016/0234024 | A1 | 8/2016 | Mozer | |

FOREIGN PATENT DOCUMENTS

| | | |
|---|---|---|
| WO | WO 2008126180 | 10/2008 |
| WO | WO 2013047534 | 4/2013 |
| WO | WO 2018123190 | 7/2018 |

OTHER PUBLICATIONS

International Preliminary Report on Patentability in International Appln. No. PCT/US2021/063,477, mailed on Jul. 27, 2023, 10 pages.

Notice of Allowance in Japanese Appln. No. 2022-566204, mailed on Apr. 22, 2024, 5 pages (with English translation).

Office Action in Indian Appln. No. 202227056349, mailed on Dec. 29, 2023, 6 pages (with English translation).

Office Action in Japanese Appln. No. 2022-566204, mailed on Jan. 9, 2024, 4 pages (with English translation).

Aslam et al., "Distributed certificate and application architecture for VANETs." MILCOM 2009-2009 IEEE Military Communications Conference. IEEE, Oct. 18, 2009, 1-7.

Developers.google.com [online], "Cookie Matching" Jun. 2019, retrieved on Dec. 13, 2022, retrieved from URL <https://developers.google.com/authorized-buyers/rtb/cookie-guide>, 29 pages.

Github.com [online], "Trust Token Api" Aug. 2019, retrieved on Dec. 13, 2022, retrieved from URL <https://github.com/WICG/trust-token-api#trust-token-redemption>, 13 pages.

Github.com [online], "Trust Token" Oct. 2017, retrieved on Dec. 13, 2022, retrieved from URL <https://github.com/trusttoken>, 3 pages.

Iabtechlab.com [online], "Ads.Txt—Authorized Digital Sellers" May 2017, retrieved on Dec. 13, 2022, retrieved from URL <https://iabtechlab.com/ads-txt/>, 5 pages.

International Search Report and Written Opinion in International Appln. No. PCT/US2021/063,477, dated Apr. 4, 2022, 16 pages.

Wikipedia.org [online], "Initialization vector" created on Oct. 2002, retrieved on Dec. 13, 2022, retrieved from URL <https://en.wikipedia.org/wiki/Initialization_vector>, 5 pages.

Office Action in Chinese Appln. No. 202180030995.4, mailed on Aug. 26, 2024, 19 pages (with English translation).

\* cited by examiner

SECURE NETWORK COMMUNICATIONS THAT LIMIT INFORMATION ACCESS

CROSS-REFERENCE TO RELATED APPLICATIONS

This application is a National Stage Application under 35 U.S.C. § 371 and claims the benefit of International Application No. PCT/US2021/063477, filed Dec. 15, 2021, which claims the benefit of priority of IL Application No. 280116 filed on Jan. 12, 2021, both of which are incorporated by reference herein in their entirety for all purposes.

TECHNICAL FIELD

This specification is related to data security and cryptography.

BACKGROUND

Client devices transmit requests and other data over public networks, such as the Internet. These communications can be altered by other parties, such as parties that intercept the communications and/or intermediaries that receive the communications and forward them to other parties. Client devices are also subject to malicious attacks, such as viruses and malware that can send fraudulent requests without the user's knowledge or authorization. In addition, other parties can emulate a client device to send requests that appear to originate from the client device, but actually come from a device of the other parties.

SUMMARY

In general, one innovative aspect of the subject matter described in this specification can be embodied in methods that include determining, for a given domain, engagement by a user with content provided by the given domain for display by an application at a client device of the user. A determination is made, based on the engagement by the user, to extend, for the given domain, a linkage between user identifiers for a user of the application. In response to determining to extend, for the given domain, the linkage between the user identifiers for the user of the application, one or more future domain-specific ephemeral user identifiers for the user and the given domain are obtained. Each future domain-specific ephemeral user identifier is a user identifier that the application will use to identify the user to the given domain during a future time period after a current time period lapses. An attestation record is generated. The attestation record includes a set of data includes payload data, a digital signature of the set of data, a current domain-specific ephemeral user identifier for the user and the given domain, and the one or more future domain-specific ephemeral user identifiers for the user and the given domain. The attestation record is sent to the given domain. Other implementations of this aspect include corresponding apparatus, systems, and computer programs, configured to perform the aspects of the methods, encoded on computer storage devices.

These and other implementations can each optionally include one or more of the following features. In some aspects, the set of data includes a timestamp indicating a time at which the attestation record is generated and a signed redemption record. The payload data can include the one or more future domain-specific user identifiers for the user and the given domain.

In some aspects, the engagement by the user includes a level of user engagement by the user with the content provided by the given domain for display by the application at the client device of the user. Some aspects can include selecting a quantity of the one or more future domain-specific user identifiers for the user and the given domain based on the level of user engagement for the given domain.

In some aspects, the current domain-specific user identifier and the one of more future domain-specific user identifiers are encrypted using an encryption key of the given domain. In some aspects, the attestation record includes, for each of multiple domains including the given domain, a respective current user identifier for the domain.

In some aspects, the current domain-specific ephemeral user identifier for the user and the given domain includes a current public key for the user and the given domain. Each of the one or more future domain-specific user identifiers comprises a future public key for the user and the given domain.

In some aspects, the given domain is a domain of a publisher of electronic resources. Determining, for the given domain, the user engagement by the user with content provided by the given domain for display by the application at the client device of the user can include determining a level of user engagement based on the user navigating to an electronic resource of the publisher.

In some aspects, the given domain is a domain of a content platform that distributes digital components or of a content platform that facilitates distribution of digital components by another content platform. Determining, for the given domain, the engagement by the user with content provided by the given domain for display by the application at the client device of the user can include determining a level of user engagement based on the content platform providing one or more digital components for presentation at the client device.

In some aspects, the given domain is a domain of a digital component provider that creates digital components that include content of the digital component provider. Determining, for the given domain, the engagement by the user with content provided by the given domain for display by the application at the client device of the user can include determining a level of user engagement based on the user interacting with a digital component created by the digital component provider.

Content providers can use a user identifier associated with a user to provide customized content for the user, e.g., such that the provided content is more beneficial to the user than non-customized content. For example, such content providers can collect information about the user over time using the user identifier. However, some entities may collect user data using a stable identifier without providing any benefit to the user. To prevent such collection of user data and improve user data security, the user identifier for a user can be changed periodically. However, such changes for content providers that provide customized content to the user can abruptly reduce the benefits for the user as the content providers would have to restart the process of collecting information for a user each time the user identifier is changed. Indeed, any system that makes use of the ability to identify a user over an extended time period can suffer negatively when a user identifier is changed, as the system is then required to collect data from the user again and loses knowledge regarding any history of the user's interactions with at least some elements of the system. The periodic changing of user identifiers can therefore increase the amount of data transmission across a network, due to the recollection of previously obtained data regarding the user, and prevent certain functionality that relies on the ability to identify a previous user of the system/service.

The techniques described in this document enable content providers that contribute to the selection of content for a user or from which the user has requested content to link multiple user identifiers for a user such that these content providers can maintain user information across multiple user identifiers even when the user identifiers are changed. The techniques described in this document also enable data or service providers that provide data/content for a user or from which the user has requested data/content to link multiple user identifiers for a user such that these data providers can maintain user information across multiple user identifiers even when the user identifiers are changed. For example, an application (e.g., web browser) can provide, to a content provider that contributed to the selection of content for a user, the current user identifier for the user and one or more future user identifiers that the application will use to identify the user during a future time period. In this way, the content provider can correlate future communications that include a future user identifier with the current user identifier and continue accumulating information about the user across multiple user identifiers for the user.

The subject matter described in this specification can be implemented in particular embodiments so as to realize one or more of the following advantages. By selectively providing user identifier linkability to only entities that contribute in some positive way, the availability of user information for each user is greatly limited across the online ecosystem while still enabling positively contributing content providers to provide beneficial content to users. These techniques prevent entities that would normally passively collect such information (e.g., to sell to other entities) from being able to correlate user information for a user over long time periods. Instead, these entities would have to start over each time a new user identifier is assigned to the user, resulting in minimal user information for each user.

The user identifiers can be domain-specific and encrypted for each domain such that only a single domain can use a given user identifier to correlate data received in multiple communications with the same user. In this way, the application can selectively link user identifiers for domains that make a positive contribution, while preventing such linking for non-contributing domains. This also enables the application to provide user identifiers for multiple recipients in the same communication, thereby reducing the number of communications transmitted over a network and the amount of consumed network bandwidth. In addition, by selectively providing user identifier linkability to specific domains, the use of a stable long-term user identifier is avoided. This improves user data security and privacy as the transient nature of the user identifier prevents malicious third parties from tracking, or otherwise making use of potentially sensitive data of, a particular user as the user identifier is changed periodically. The current and future user identifiers may be encrypted and provided to the specifically intended domain, greatly minimizing the risk of data theft and other security risks from malicious third parties.

The user identifiers can be in the form of public keys. To reduce the data size of the user identifiers, the user identifier can be a cryptographic hash of the public key and this cryptographic hash can be truncated to a particular length or data size. This reduces data storage requirements for content providers that may store many user identifiers for each user for linking purposes. This also reduces the data size of the communications that include the user identifiers, resulting in faster data transmissions, less consumed network bandwidth, and less battery consumption in generating the communications. Aggregated over many thousands or millions of users, these savings are substantial.

Using ephemeral user identifiers with linkability enables applications, e.g., browsers, to block domains that are not directly involved in serving personalized content from tracking users over extended periods of time, while still enabling contributing publishers to identify users to infer users' interest and store users' preferences and enabling contributing content platforms to collect such information over multiple publisher domains. The ephemeral identifiers supports these features, while giving application developers, e.g., browser developers, control over the lifespan of ephemeral identifiers and the extent of linkability for each domain such that the application developers can implement solutions that preserve user privacy while enabling customized content that improves the user experience. The ability to prevent certain domains through the use of ephemeral user identifiers provides yet further security benefits as malicious domains may be prevented from obtaining the current user identifier.

Using attestation records, (e.g., attestation tokens) to transmit data from client devices provides a secure communication channel between the client devices and the computers or other devices of recipients. Including, with the attestation record, a digital signature generated based on the data included in the attestation record enables the recipients to verify that the data in the attestation record was not modified after the attestation record was created, e.g., during transmission between the client device and the recipient. The inclusion of a token creation time in the attestation record enables recipients to detect replay attacks and/or falsified data transmissions.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for controlling access to user information using ephemeral user identifiers. An application, e.g., a web browser, can send communications to various domains. A communication sent to a domain can include an ephemeral user identifier for the user using the application and the domain. That is, the ephemeral user identifier can be used by the domain to identify the user and to correlate information included in multiple communications with the user. The application can use each ephemeral user identifier for a given time period and, once the time period lapses, use a different ephemeral user identifier for the user and the domain. The given time period can be one hour, two hours, one day, one week, or another appropriate time period.

To enable some domains to correlate user information with a user for time periods longer than the given time period, the application can enable these recipients to link multiple user identifiers for the same user. To do this, the application can send, to a domain, both the current user identifier for the user and one or more future user identifiers for the user. The future user identifiers can be ephemeral user identifiers that will each be used by the application for a respective future time period that occurs after the current time period. For example, assume the time period for each ephemeral user identifier is one day. During the day that the current user identifier is being used to identify the user to the domain, the application can also send, to the domain, the user identifier that will be used the next day. In this way, the domain can link the two user identifiers and correlate information received in communications that include the current user identifier with information received in communications that include the user identifier for the next day.

The application can provide future user identifiers to specific domains, such as those that contribute to the selection of content that is displayed at the client device of the user or other specific domains, while not providing future user identifiers to certain other domains that do not contribute to the selection of content that is displayed at the client device or deemed to be unsuitable/malicious for other reasons. This selectively controls which domains can correlate user information over longer periods of time, e.g., to build user profiles that can be used to customize or provide certain content/data/functionality for the user, which reduces the number of domains that have user information and better preserves user privacy.

Figure 1:
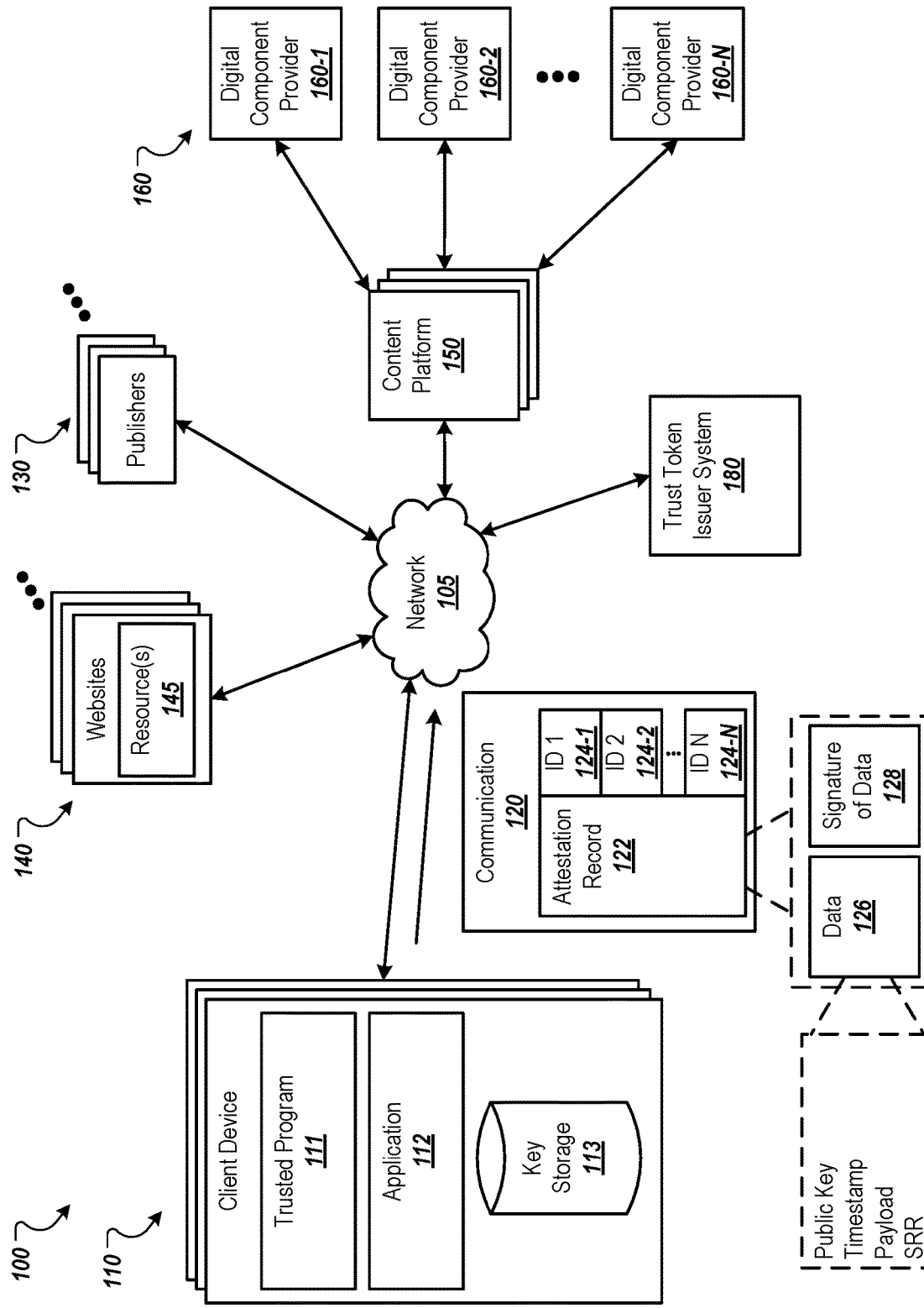
FIG. 1 is a block diagram of an environment in which applications link user identifiers for domains that contribute to the selection of content displayed at client devices.

FIG. 1 is a block diagram of an environment 100 in which applications 112 link user identifiers for domains that contribute to the selection of content displayed at client devices 110. The example environment 100 includes a data communication network 105, such as a local area network (LAN), a wide area network (WAN), the Internet, a mobile network, or a combination thereof. The network 105 connects client devices 110, content platforms 150, websites 140, publishers 130, and a trust token issuer system 180. The environment 100 can include many client devices 110, content platforms 150, websites 140, publishers 130, and trust token issuer systems 180.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system).

A client device 110 can also include a trusted program 111. The trusted program 111 can include trusted code from a reliable source that is difficult to falsify. For example, the trusted program 111 can be an operating system, a portion of an operating system, a web browser, etc. Generally, the trusted program 111 is difficult to infiltrate, and the amount of time and effort that a perpetrator would need to expend to tamper with the trusted program 111 is prohibitively high, e.g., not economically viable for the perpetrator. Additionally, because the trusted program 111 is provided and maintained by a reliable source, any vulnerabilities that arise can be addressed by the source.

The trusted program 111 can be local to client device 110. For example, the trusted program 111 can be a device driver of the operating system of client device 110. In some implementations, the trusted program 111 operates entirely locally to client device 110, reducing the need to transmit user information. In some implementations, the trusted program 111 can operate locally to client device 110 and over a network, such as network 105. For example, the trusted program 111 can be a web browser that is installed on client device 110 and transmits and receives information over the network 105. As described in more detail below, the trusted program 111 can maintain encryption keys in a secure key storage 113.

Some resources, application pages, or other electronic content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for display to a user of the client device 110. The application 112 can request digital components from one or more content platforms 150.

Content platforms 150 can select and distribute digital components for display with webpages, native application content, and/or other electronic resources or content. The content platforms can include supply-side platforms (SSPs) and/or demand-side platforms (DSPs). Some publishers 130 use an SSP to manage the process of obtaining digital components for digital component slots of its resources and/or applications. An SSP is a technology platform implemented in hardware and/or software that automates the process of obtaining digital components for the resources and/or applications. Each publisher 130 can have a corresponding SSP or multiple SSPs. Some publishers 130 may use the same SSP.

Digital component providers 160 can create (or otherwise publish) digital components that are displayed in digital component slots of publisher's resources and applications. The digital component providers 160 can use a DSP to manage the provisioning of its digital components for display in digital component slots. A DSP is a technology platform implemented in hardware and/or software that automates the process of distributing digital components for display with the resources and/or applications. A DSP can interact with multiple supply-side platforms SSPs on behalf of digital component providers 160 to provide digital components for display with the resources and/or applications of multiple different publishers 130. In general, a DSP can receive requests for digital components (e.g., from an SSP), generate (or select) a selection value for one or more digital components created by one or more digital component providers based on the request, and provide data related to the digital component (e.g., the digital component itself) and the selection parameter to an SSP. The selection value can indicate an amount that the digital component provider 160 is willing to provide for display or user interaction with the digital component. The SSP can then select a digital component for display at a client device 110 and provide, to the client device 110, data that causes the client device 110 to display the digital component.

Each publisher 140, content platform 150, and digital component provider 160 can be associated with a respective network domain (also referred to as a domain for brevity) that is identified by a domain name. A network domain is a group of one or more computers associated with the same infrastructure. For example, the domain for a publisher 130 can include web servers that provide electronic resources (e.g., web pages) of the publisher 130 to browsers in response to requests received from the browsers.

When the client device 110 sends a communication 120 to a recipient, e.g., to a content platform 150 or to a domain of a publisher 130 that hosts a website, the client device 110 can send an attestation record 122 with the communication 120 or send the communication 120 in the form of an attestation record 122. The attestation record 122 can be in the form of an attestation token, which can be a composite message that includes a digital signature. The trusted program 111 can generate an attestation record 122 for a communication 120 in response to a request from an application 112.

An attestation record 122 can include a set of data 126 and a digital signature 128 of the set of data 126. The set of data 126 can include a public key, a timestamp, payload data, and/or a signed redemption record (SRR). The public key can be a public key embedded in, or otherwise linked to the SRR (e.g., when the communication 120 is sent by a browser) or a device public key of the client device 110 (e.g., when the communication 120 is sent by a native application). In either case, the public key can have a corresponding private key that is cryptographically linked to the public key. A private key can be used to generate a digital signature for a set of data and the corresponding public key can be used to verify the signature using the set of data. The public key can be used to encrypt a set of data and the corresponding private key can be used to decrypt the encrypted set of data.

The timestamp indicates a time at which the attestation record is generated. The timestamp can be a high resolution timestamp, e.g., which millisecond resolution. The payload data can vary based on the use case. For example, when the communication 120 is for requesting a digital component, the payload data can include contextual data related to a digital component slot for which a digital component is being requested. When the communication 120 is for reporting an event, the payload data can include data describing the event.

The trust token issuer system 180 can issue trust tokens and redeem trust tokens for SRRs. To issue a trust token to a client device 110, the trust token issuer system 180 can evaluate fraud detection signals received from the client device 110 to determine whether the client device 110 is trustworthy. If so, the trust token issuer system 180 can issue one or more trust tokens to the client device 110. The client device 110 can then redeem a trust token for an SRR. Each SRR can be for an individual communication 120 and can include a network location (e.g., Universal Resource Locator (URL)) to which the communication 120 is being sent. The SRR can also include a cryptographic hash of the application 112 or client devices user identifier, which could be in the form of a public key, and a digital signature of a set of data that includes at least the network location and the cryptographic hash of the application 112 or client device's user identifier. This digital signature can be generated using a private key of the trust token issuer system 180 so that recipients of the communication 120 can verify that the content of the SRR has not been modified since signed over by the trust token issuer system 180 and so that the recipients can confirm that the SRR was generated by the trust token issuer system 180. The SRR is an optional component of the attestation record. The SRR provides incremental fraud/abuse detection power by proving that the trust token issuer 180 has some knowledge about the application and/or the device and considered the application and/or the device is trustworthy.

The trusted program 111 can generate a data structure, e.g., a composite message, that includes the set of data 126. The trusted program 111 can then generate a digital signature of the set of data 126 using a private key corresponding to the application or device public key included in the set of data, e.g., the device private key corresponding to the device public key.

The attestation record 122 can also include one or more user identifiers 124 for the user of the application 112. For example, the attestation record 122 can include, for each recipient domain that will receive the communication 120, a current user identifier for the user and for that domain. To prevent unintended domains from tracking a user and to selectively limit the ability of domains to track a user, a different user identifier can be used for each domain. Each user identifier can be encrypted using a public key of the owner domain for that user identifier. In this way, only the intended domain can decrypt its user identifier for the user using its corresponding private key. When encrypting the user identifiers, the application 112, or the trusted program 111, can use the digital signature 128 of the attestation record as an initialization record for the encryption algorithm to cryptographically link the user identifier to the signature of data 128 and the attestation record 122.

In some implementations, the user identifiers can be separate from the set of data 126 that is signed over to generate the digital signature 128. In this way, the user identifiers can be separated from the attestation record 122 without breaking the digital signature 128, e.g., without making verification of the digital signature 128 fail due to change in the set of data 126.

In some implementations, each user identifier is in the form of a public key. The application 112 (or trusted program 111) can generate a public key and private key pair for each of multiple domains that may be the recipient of communications sent from the application 112. The application 112 can use the public key generated for a domain as a user identifier that identifies the user to the domain. Although largely described in the document as a public key for the user, the public keys used to identify the user can be public keys for the application 112, the publisher of the application 112, or the client device 110 of the user.

To control the ability of domains to track users for long periods of time, the application 112 can change, e.g., rotate, the user identifiers periodically. When the application 112 changes, for a domain, the user identifier that identifies the user to the domain, subsequent communications sent by the application 112 to the domain will include the new user identifier rather than the previous user identifier. If the application 112 did not provide the ability to link the two user identifiers to the domain, the domain would not be able to correlate the two user identifiers and therefore would not be able to determine that the new user identifier is for the same user as the previous user identifier.

When public keys are used at the user identifier, the application 112 can make the public key for a domain available only to that domain. The application 112 can keep the private key that corresponds to the public key strictly confidential, e.g., in the key storage 113, so that the application 112 can prove its ownership of the public key by signing outgoing communications with the private key so that the digital signature is verifiable using the public key and/or by using the private key to decrypt incoming communications that were encrypted using the public key.

Let the parameter "unit_of_time" represent the lifespan of an ephemeral public key used as a user identifier to identify the user to a domain. For each combination of a duration of time in the unit of time since a reference time and domain name, the application 112 can create a public key and private key pair for each domain using the duration of time and the domain name for the domain. For example, if the unit of time is one day, the application 112 can create, for each domain, a key pair for each day using a combination of the number of days since the reference time and the domain name for the domain. The time duration can be denoted as "unit_of_time_since_ref" and the owner domain name for the keys can be denoted as "owner_domain." In some implementations, the reference time is an epoch time. The public key for a particular domain and particular time duration can be denoted as $\text{PublicKey}_{unit\_of\_time\_since\_ref,\ owner\_domain}$. Similarly, the corresponding private key can be represented as $\text{PrivateKey}_{unit\_of\_time\_since\_ref,\ owner\_domaim}$.

In some implementations, the application 112 or the trusted program can generate a master private key for alldomains. In some implementations, the application 112 can use Elliptic Curve Digital Signature Algorithm (ECDSA) and/or Diffie-Hellman public keys (DHPKs) that are based on the elliptic curve version of exponentiation (i.e., curve multiplication) based ciphers. Using such techniques, the fact that private keys are random elements in the field can be leveraged to concisely represent pseudo-randomly a multitude of keys, each associated with a different domain.

Given an ephemeral private key X (where the corresponding public key is $g^x$ and is a basic g in the group raised to the private key X) and a domain D, let the application 112 have a pseudorandom-MAC key S. For domain D, let Yd=MAC (S, X||D), where MAC is a message authentication code. As used herein, the symbol || represents a composite message. Thus, X||D is a composite message of the key S and the domain name D. If more bits are needed, two MAC keys S1 and S2 can be used. In this example, Yd=MAC(S1, X||D) ||MAC(S2, X||D). In either example, the domain-specific private key for a domain is YD=MAP(Yd) for the domain. The ephemeral private key X is a master key for generating the domain-specific keys for the various domains.

In particular, HMAC-SHA256 can be the pseudorandom—MAC function and the MAP function can take the generated string and map it into a shorter field. This mapping can be a modular reduction, starting with a pseudorandom string of 512 bits output by the MAC function and reducing mod a prime of 256 bits, which gives a random looking number in the field. This generates a proper scalar for curve multiplication, e.g., mapping extended strings to the field makes the choice almost uniform. For example, Yd can be 512 bits, the field can be 256 bit prime-based (other quantities of bits can also be used) and the domain-specific private key YD will be a pseudorandom element modulo the prime of 256 bit length.

Given that the pseudorandom-MAC key S is secure and a key to a pseudorandom function, then all domain keys are generated pseudorandomly and appear as though they are randomly generated per domain. The corresponding public key for a domain can be $g^{YD}$ (e.g., g raised to the private key, using modular exponentiation over number theoretic groups or curve multiplication over elliptic curve groups) for a time period when ephemeral private key X is valid. When new user identifiers are generated for the user, ephemeral private key X is changed (S can be changed as well) and so will the domain-specific keys YD that serve as the user identifiers.

The application 112 can change the user identifier for each domain periodically based on a specified time period. For example, the application 112 can change the user identifiers every hour, every two hours, every 12 hours, every day, once every two days, once a week, or based on another appropriate time period. Using the master key example above, the application 112 can generate, for each domain, a domain-specific key YD each time the time period lapses. In some implementations, rather than store many keys for many different domains, the application 112 can generate the keys at the time that the keys will be changed or a short period of time before the keys will be changed.

As described below with reference to FIG. 2, the application 112 can enable a domain to link user identifiers across multiple time periods by providing one or more future user identifiers that the application 112 will use to identify the user for the domain in one or more respective future time periods. In such a case, the attestation record 122 can include the one or more future user identifiers for the domain, e.g., encrypted using an encryption key of the domain, which is often the domain's public key. The future user identifiers can be included in the payload data of the attestation record 122 or separate from the set of data 126 signed over, similar to the current user identifiers. The current domain-specific user identifier and the one or more future domain-specific user identifiers for a domain can be encrypted together, e.g., as one encrypted element, or separately as individual encrypted user identifiers.

The application 112 can enable the user to reset all user identifiers for the user for all domains or for particular domains. For example, the application 112 can provide a user interface that enables the user to reset the user identifiers for the domains and/or to prevent one or more domains from receiving any user identifiers. If the user selects to reset the user identifiers for all domains, the application 112 can reset the ephemeral private key X and the HMAC secret key S. Alternatively, the application 112 can periodically reset the user identifiers by resetting the ephemeral private key X and the HMAC secret key S.

In some implementations, it can be beneficial to offset the validity time periods for user identifiers of various domains such that all domains do not lose the ability to leverage data collected over multiple time periods at the same time. To prevent this, each instance of the application 112 on various client devices 110 can generate a random or pseudorandom floating point number that can be denoted as "era_value" to start a new data collection era at a different time. The era can be a maximum duration in which a domain can collect and correlate data for a user with linked ephemeral user identifiers. For simplicity, the era can be defined as multiples of the unit_of_time. For example, if the unit of time is an hour and the era is 2160 hours, a domain would not be able to collect data for a user for more than 90 days in a row.

For a given instance of the application 112, an era identifier "era_id" can be defined as $$era_{id} = \text{round\_down\_to\_nearest\_int}\left(\frac{\text{current\_unit\_of\_time\_since\_epoch} + \text{era\_value}}{\text{era}}\right).$$

Given a domain "owner_domain," as well as the application-specific confidential ephemeral private key X, and pseudorandom HMAC secret key S, let Yd=HMAC(X, era_id, unit_of_time_since_epoch, owner_domain). That is, Yd is a message code computed based on the application-specific confidential ephemeral private key X, the era identifier "era_id," the unit of time since the reference time (epoch in this example), and the domain name of the owner domain. The application 112 can compute the public key for a domain based on Yd, as described above.

When the application 112 calculates the public key for a future time period using unit_of_time_since_epoch ahead of the current time, as long as the future time indicated by unit_of_time_since_epoch and the current time share the same era identifier, the application 112 will actually use the public key for the owner domain when the time comes. However, if the future time period indicated by unit_of_time_since_epoch belongs to a different era, the application 112 will use a different public key for the owner domain when the time in the new era comes. Therefore, this approach automatically breaks the linkability for all domains when the new era for the instance of the application 112 starts.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
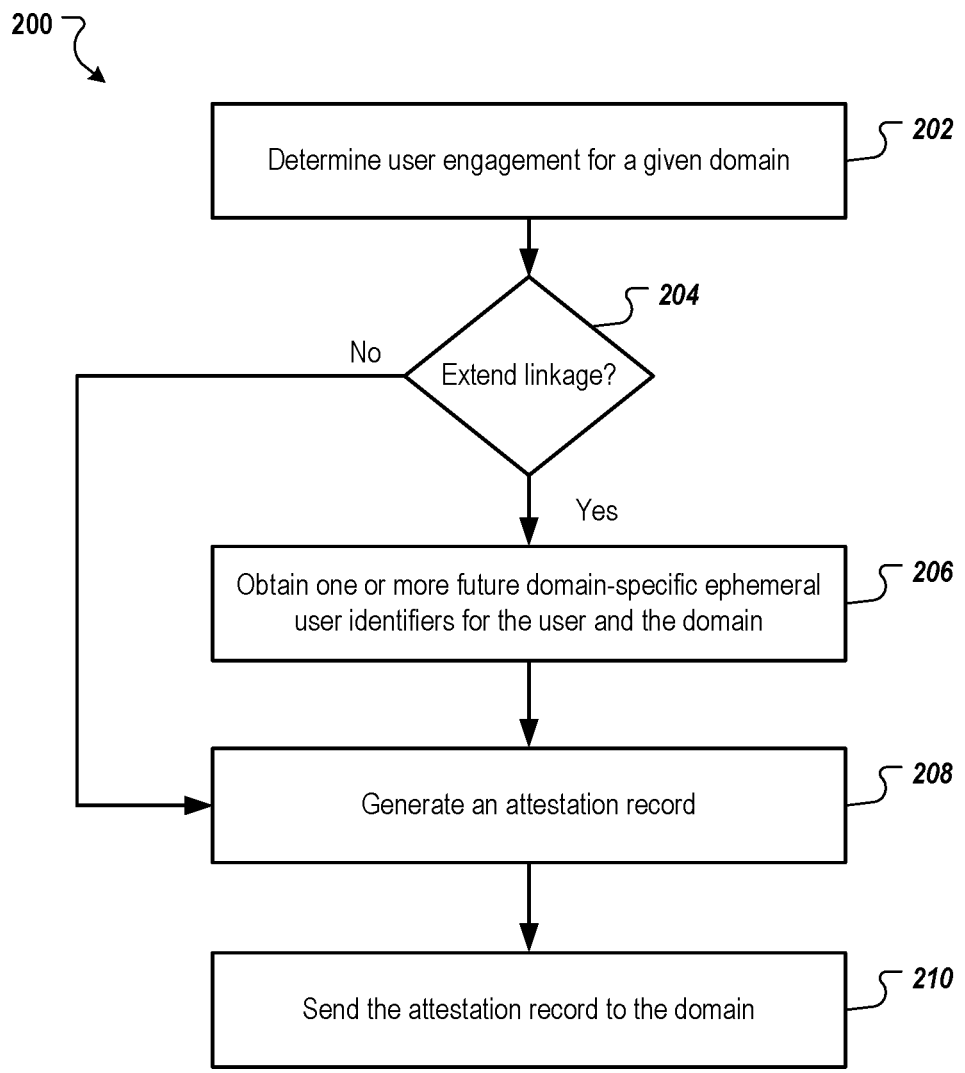
FIG. 2 is a flow diagram of an example process for sending an attestation record that enables linking user identifiers for a domain.

FIG. 2 is a flow diagram of an example process 200 for sending an attestation record that enables linking user identifiers for a domain. The example process 200 can be performed by an application 112 of a client device 110. Operations of the process 200 can also be implemented as instructions stored on one or more computer readable media which may be non-transitory, and execution of the instructions by one or more data processing apparatus can cause the one or more data processing apparatus to perform the operations of the process 200. For brevity and ease of description, the process 200 is described as being performed by the application 112.

The application 112 determines user engagement for a given domain (202). For example, the application 112 can determine a level of user engagement for the user and the given domain. The level of user engagement can be based on user engagement with content provided by the given domain for display by the application 112 running on a client device 110 of the user, e.g., an application 112 or client device 110 that the user is signed into. In general, the level of user engagement can represent the user's intent to view and/or interact with content provided by the given domain. Various user interactions or contributions by the domain into the selection of content for display by the application 112 can be used to determine the level of user engagement. In addition, the level of user engagement can be determined based on different events for different types of domains, e.g., domains that provide first party content, e.g., web pages, versus content platforms that provide third party content, e.g., digital components, for display with the first party content.

The application 112 can use a set of rules or logic to determine the level of user engagement for a domain. In some implementations, the application 112 can determine, as the level of user engagement, a score based on one or more events for the domain. The events can include user requests for content, the display of content to the user, user selection of links or digital components that point to content, etc. Each type of event can have a corresponding value. The application 112 can determine the score by aggregating the values for the events for the domain over a given time period, e.g., the time period that a current ephemeral user identifier for the domain is valid. As described below, to determine whether to enable a linkage between user identifiers for a domain, the application 112 can compare the level of user engagement for the domain to a specified threshold. In another example, the application 112 can determine when certain events occur and, if so, enable the linkage, e.g., without computing a score based on multiple events.

The level of user engagement for a given domain can be based on one or more user requests for content from the domain. For example, if a user navigates a browser to a website of a publisher domain, this shows that the user has an intent to view content of the publisher domain. Thus, determining a sufficient level of user engagement by a user with content provided by a particular domain may simply be determining that the user interacted with content provided by the particular domain. In another example, if the user interacts with, e.g., selects, a link as part of the organic content from the publisher, and the link points to a web page within the same publisher domain, the user has meaningful interaction with the publisher domain. The application 112, which can be a browser, can detect the domains to which the user navigates and determine the level of user engagement for the domains based on these events.

The level of user engagement for a given domain can be based on the given domain providing customized content for display with other content. For example, a content platform 150 can provide digital components that are personalized for the user based on the current ephemeral user identifier received by the content platform 150 in a request for a digital component. When a digital component is received or rendered, the digital component can include information, e.g., metadata, that indicates which content platforms 150 participated in selecting the content and a link to a domain of a digital component provider 160 to which content of the digital component corresponds. The application 112 can use this information to determine the level of user engagement for the domain of each participating content platform 150 and the domain of the digital component provider 150. For example, the rendering of the digital component can be an event used to determine a score for each domain and/or can be used to determine that the level of user engagement for each domain meets a threshold for enabling the user identifier linkage.

The level of user engagement for a given domain can be based on the given domain assisting or otherwise facilitating the distribution of customized content for display with other content. For example, a content platform can contribute to the process of distributing digital components, or otherwise facilitate other content platforms to distribute digital components. The domain that directly distributes digital components to the application 112 can inform the application 112 of such helper domains. Such knowledge can also enable the application 112 to give credit to the helper domains so that the helper domains can store information about the user over extended periods of time based on user identifier linking, similar to how user identifier linkage is enabled for the domain that directly provides digital components to the application 112.

The level of user engagement for a given domain can be based on user interaction with a digital component. A user interaction with a digital component represents an intent of the user to view additional content related to the digital component, e.g., additional content of the digital component provider 160 that created the digital component. The value for a user interaction can be greater than that for the rendering of the digital component, e.g., when the level of user interaction is a score. For a user interaction with a digital component, the application 112 can determine the level of user engagement for each content platform 150 that participated in the selection of the digital component and for the digital component provider, similar to that of rendering of a digital component. Other events can also be used to determine the level of user engagement for a domain.

The application 112 determines, based on the level of user engagement, whether to extend, for the given domain, the linkage between user identifiers for the user (204). To reward the given domain for selecting and/or providing content to the user, the application 112 can enable the given domain to link a current ephemeral user identifier that identifies the user to the given domain with one or more future ephemeral user identifiers that the application 112 will later use to identify the user to the given domain.

During each of multiple time periods, the application 112 can use a respective user identifier to identify the user to the given domain. As described above, the user identifier can be a public key. At the end of each time period, the application 112 can change the ephemeral user identifier from the current ephemeral user identifier for the current time period to the next ephemeral user identifier for the next time period. If the linkage is not enabled, the given domain would not be able to determine that the current ephemeral user identifier and the next ephemeral user identifier correspond to the same user.

To determine whether to enable the linkage for the given domain, the application 112 can determine whether the level of user engagement for the given domain satisfies, e.g., meets or exceeds, a specified threshold. If so, the application 112 can enable the linkage. If a score is used for the level of user engagement, the application 112 can compare the score to the specified threshold. In another example, the application 112 can compare the type of event (e.g., user request for content or rendering of digital component) to a list of events that satisfy the threshold, e.g., that are considered meaningful events.

The application 112 can determine whether to enable the linkage in response to events. For example, if the user navigates to a web page of the given domain, the application 112 can determine that this event represents a level of user engagement that satisfies the threshold and enable the linkage in response to detecting the event. In some implementations, the application 112 can determine whether to enable the linkage periodically. For example, at or near the end of each time period for which a user identifier is valid, the application 112 can determine, based on events that occurred during the time period, whether to enable the linkage.

If the application 112 determines to not extend the linkage between ephemeral user identifiers for the given domain, the application 112 can generate an attestation record that includes the current user identifier for the user and the given domain, but without any future user identifiers for the user and the given domain, as described below with reference to operation 208.

If the application 112 determines to extend the linkage between ephemeral user identifiers for the given domain, the application 112 can obtain one or more future domain-specific ephemeral user identifiers for the user and the given domain. Each future ephemeral user identifier can be a user identifier that the application 112 will use to identify the user to the given domain during a respective future time period that will occur after the current time period for which the current ephemeral user identifier for the user and the given domain is valid. For example, if the unit of time for the user identifiers is one day, the current ephemeral user identifier is for the current day (e.g., Monday). The future ephemeral user identifiers can include a future ephemeral user identifier for the following day (e.g., Tuesday) and a future ephemeral user identifier for the next following day (e.g., Wednesday). While the unit of time for which an ephemeral user identifier is valid has been described as a day in this example, the unit of time could take any length and indeed could be different for different user identifiers and/or different users. A first user identifier could have a first time period during which it is valid, and a second user identifier for the same user could have a different, or the same, second time period. Beneficially, as previously described, the use of future ephemeral user identifiers in this manner avoids the use of a persistent, stable user identifier for an extended period. This improves user data security due to the changing user identifier.

The application 112 can determine the duration of time to extend the linkage and thus, the number of future ephemeral user identifiers to provide to the given domain, based on the level of user engagement, e.g., based on the number and/or type(s) of events. For example, a higher level of user engagement can correspond to longer durations and thus, more future ephemeral user identifiers. In a particular example, the application 112 can include a set of rules that specify the duration for each type of event or each level of user engagement. For example, navigating to a domain can correspond to four units of time (e.g., four days if each user identifier is valid for one day) and rendering of a digital component can correspond to three units of time.

The application 112 can generate or obtain from storage (e.g., the key storage 113), a future domain-specific ephemeral user identifier for the user and the given domain for each unit of time for which linkage has been enabled. For example, if the application 112 determines to extend the linkage for four units of time, the application 112 can generate or obtain four future domain-specific ephemeral user identifiers, one for each time period corresponding to the four units of time.

In a particular example, if public keys are used as the user identifiers, the application 112 can generate a public key and private key pair for each of the future time periods. If the linkage is being extended for four units of time, the application 112 can generate four public keys (and their corresponding private keys):
$PublicKey_{unit\_of\_time\_since\_ref+1, owner\_domain}$,
$PublicKey_{unit\_of\_time\_since\_ref+2, owner\_domain}$,
$PublicKey_{unit\_of\_time\_since\_ref+3, owner\_domain}$, and
$PublicKey_{unit\_of\_time\_since\_ref+4, owner\_domain}$.

The application 112 (or a trusted program) generates an attestation record (208). As described above, the attestation record can include a set of data (e.g., a public key, a timestamp, payload data, and/or an SRR) and a digital signature of the set of data. The attestation record can also include, for each recipient domain of the attestation record, the current domain-specific ephemeral user identifier for the recipient domain, which can be the public key. If the application 112 determined to extend the linkage for the given domain, the attestation record can include each of the one or more future domain-specific user identifiers for the given domain. As described above, the user identifier(s) for each domain can be encrypted using an encryption key of the domain so that only that domain can access the user identifier in cleartext. The future domain-specific user identifier(s) can be included in the payload data or separate from the set of data, as described above. Although an attestation record is used in this example, the user identifier(s) can be sent using other types of messages and/or data structures.

An attestation record can be included in, or used for, communications sent to one or more recipient domains. For example, an attestation record can be included in requests for digital components. In such a request, the attestation record can include future domain-specific ephemeral user identifiers for a publisher of a web page for which digital components are being requested. In this example, the application 112 can extend user identifier linkage for the publisher based on the user navigating to the web page.

In another example, an attestation record can be included in communications reporting the rendering of a digital component to a content platform. In this example, the attestation record can include future domain-specific ephemeral user identifiers for each content platform that participated in the selection of the digital component and/or for the digital component provider 160 that created the digital component.

In another example, an attestation record can be included in communications for reporting a user interaction with a digital component to a content platform. In this example, the attestation record can include future domain-specific ephemeral user identifiers for each content platform that participated in the selection of the digital component and/or for the digital component provider 160 that created the digital component.

The application 112 sends the attestation record to the given domain (210). The application 112 can transmit the attestation record to the given domain over a network, e.g., the network 105 of FIG. 1.

A domain that receives one or more future domain-specific ephemeral user identifiers for a user can store the user identifiers with a reference to the current and/or previous user identifiers for the user. For example, the domain can maintain a table that includes an entry for each of one or more users. The table can include, for each user, the oldest user identifier used to identify the user to the domain and each other user identifier used to identify the user to the domain. The oldest user identifier can be referred to as a nominal user identifier. An example table, Table 1, is shown below.

TABLE 1

| Key (i.e., ephemeral user identifier) | Value (i.e., nominal user identifier) |
|---|---|
| $PublicKey_{unit\_of\_time\_since\_ref+1}$ | $PublicKey_{unit\_of\_time\_since\_ref}$ |
| $PublicKey_{unit\_of\_time\_since\_ref+2}$ | $PublicKey_{unit\_of\_time\_since\_ref}$ |

In Table 1, when the domain receives a communication with a current user identifier for the domain, the domain can compare the current user identifier to the keys of Table 1. If there is a match, the domain can determine that the user is the same user as the user corresponding to the nominal user identifier in the value column.

Consider, as an example, that the application 112 enables a linkage of user identifiers for a given domain and a user for two units of time, as shown in Table 1. At the time of linkage, the current domain-specific user identifier for the user and the given domain was $PublicKey_{unit\_of\_time\_since\_ref}$. In an attestation record received during the current time period, the domain received two future domain-specific user identifiers for the user and the given domain, $PublicKey_{unit\_of\_time\_since\_ref+1}$ and $PublicKey_{unit\_of\_time\_since\_ref+2}$. After the current time period elapses and the next time period begins, the application 112 can send an attestation record that includes the next user identifier for the user, $PublicKey_{unit\_of\_time\_since\_ref+1}$, as this user identifier is now the valid domain-specified ephemeral user identifier for the user and the given domain. The given domain can query Table 1 using this user identifier and determine that the user corresponding to this attestation record is the same user as the user for which communications were received that included the previous user identifier $PublicKey_{unit\_of\_time\_since\_ref}$.

Thus, the given domain can correlate information of communications that included with the user identifier $PublicKey_{unit\_of\_time\_since\_ref}$ with information included in communications that included with the user identifier $PublicKey_{unit\_of\_time\_since\_ref+1}$ as being associated with the same user. If the linkage is extended again during the second future time period corresponding to communications that included with the user identifier $PublicKey_{unit\_of\_time\_since\_ref+2}$, the given domain would receive an attestation record that includes, as the current user identifier for the user the user identifier $PublicKey_{unit\_of\_time\_since\_ref+2}$. This attestation record would also include one or more future domain-specific user identifiers for the user and the given domain. This would enable the given domain to use the user identifier $PublicKey_{unit\_of\_time\_since\_ref+2}$ to link these future domain-specific user identifiers to the nominal user identifier in Table 1.

Figure 3:
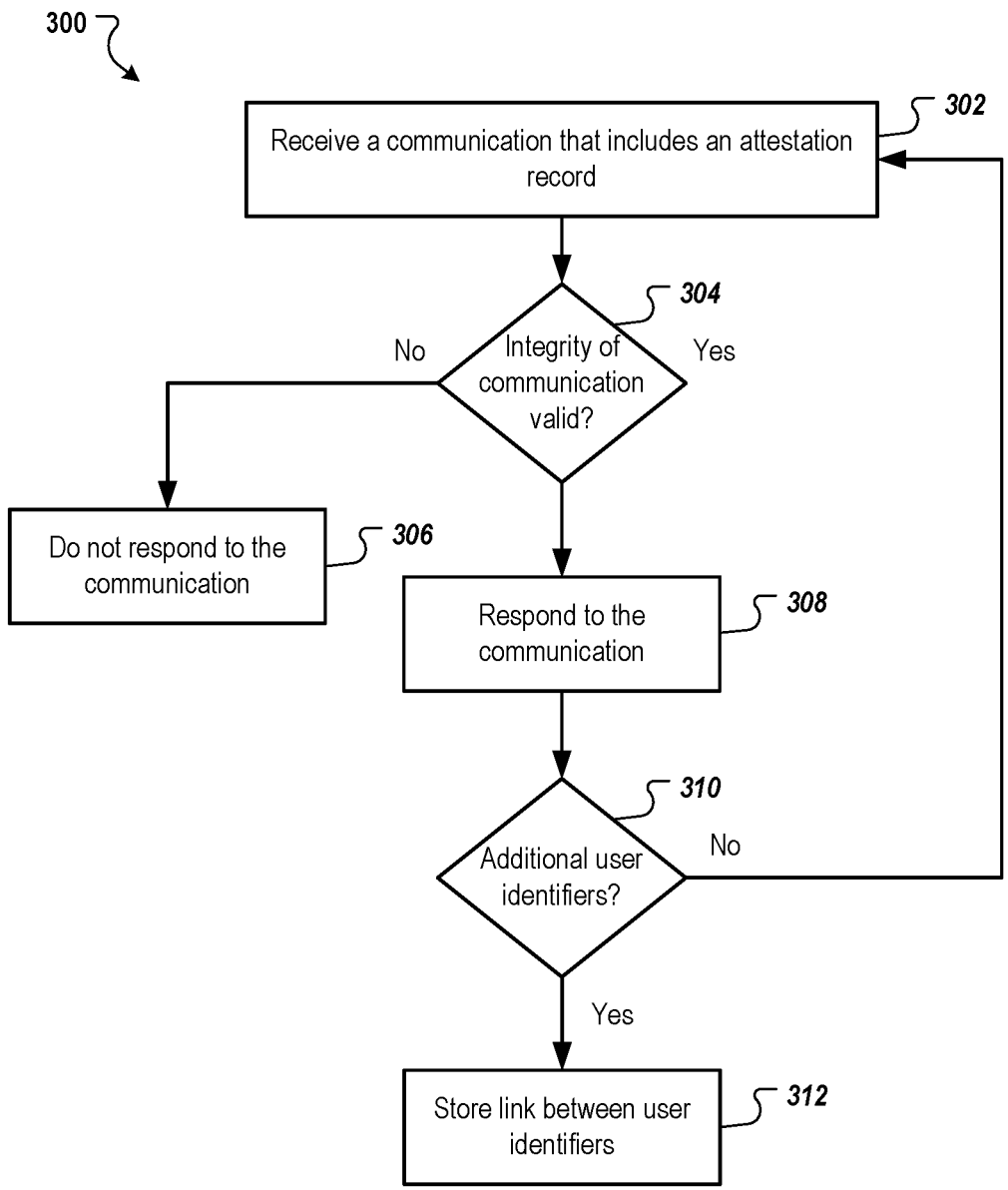
FIG. 3 is a flow diagram of an example process for linking user identifiers for a domain

FIG. 3 is a flow diagram of an example process 300 for linking user identifiers for a domain. The example process 300 can be performed by servers of a domain, e.g., servers of a publisher 130, servers of a content platform 150, or servers of a digital component provider 160. Operations of the process 300 can also be implemented as instructions stored on one or more computer readable media which may be non-transitory, and execution of the instructions by one or more data processing apparatus can cause the one or more data processing apparatus to perform the operations of the process 300. For brevity and ease of description, the process 300 is described as being performed by a server of a domain.

The server receives a communication that includes an attestation record (302). An application 112 executing on a client device 110 of a user can send the communication to the server.

The server determines whether the integrity of the communication is valid using the attestation record (304). This can include attempting to verify the digital signature using the set of data of the attestation record and the public key included in the attestation record. This can also include determining whether the timestamp included in the attestation record is within a threshold duration of a current time. This can also include verifying the SRR, e.g., verifying the digital signature of the SRR and, if the SRR includes a timestamp, determining whether this timestamp is within the threshold duration of the current time. In some implementations, the server only determines that the integrity of the communication is valid in response to all verifications being successful.

If the server determines that the integrity of the communication is not valid, the server does not respond to the communication (306). For example, the server can ignore the communication and/or delete the communication.

If the server determines that the integrity of the communication is valid, the server responds to the communication (308). For example, if the communication is a request for content, the server can select and provide content in response to the communication. If the communication is to report an event, the server can respond by storing data related to the event, e.g., the payload data of the attestation record.

The server can determine whether the attestation record includes any future domain-specific ephemeral user identifiers for the domain (310). For example, the server can attempt to decrypt ephemeral user identifiers included in the payload data of the attestation record or included as attachment or otherwise part of the attestation record but separate from the set of data signed over.

If the server successfully decrypts any future domain-specific ephemeral user identifiers for the domain using its decryption key, which could be the domain's private key, the server can store a link between the current domain-specific user identifier for the user and the domain (or a nominal user identifier for the user and the domain) and each future domain-specific ephemeral user identifier. For example, the server can add rows to a table similar to Table 1. Each added row can include the nominal user identifier for the user and the domain and a future domain-specific ephemeral user identifier for the user and domain. As the server is able to store a link between the current domain-specific user identifier for the user and the domain and each future domain-specific ephemeral user identifier, the server is able to identify a particular user over multiple communications and an extended time period without requiring a persistent user identifier. This means that ephemeral user identifiers may be used while still allowing the server to identify a same user over time, providing a more secure method of identifying a user over time.

Figure 4:
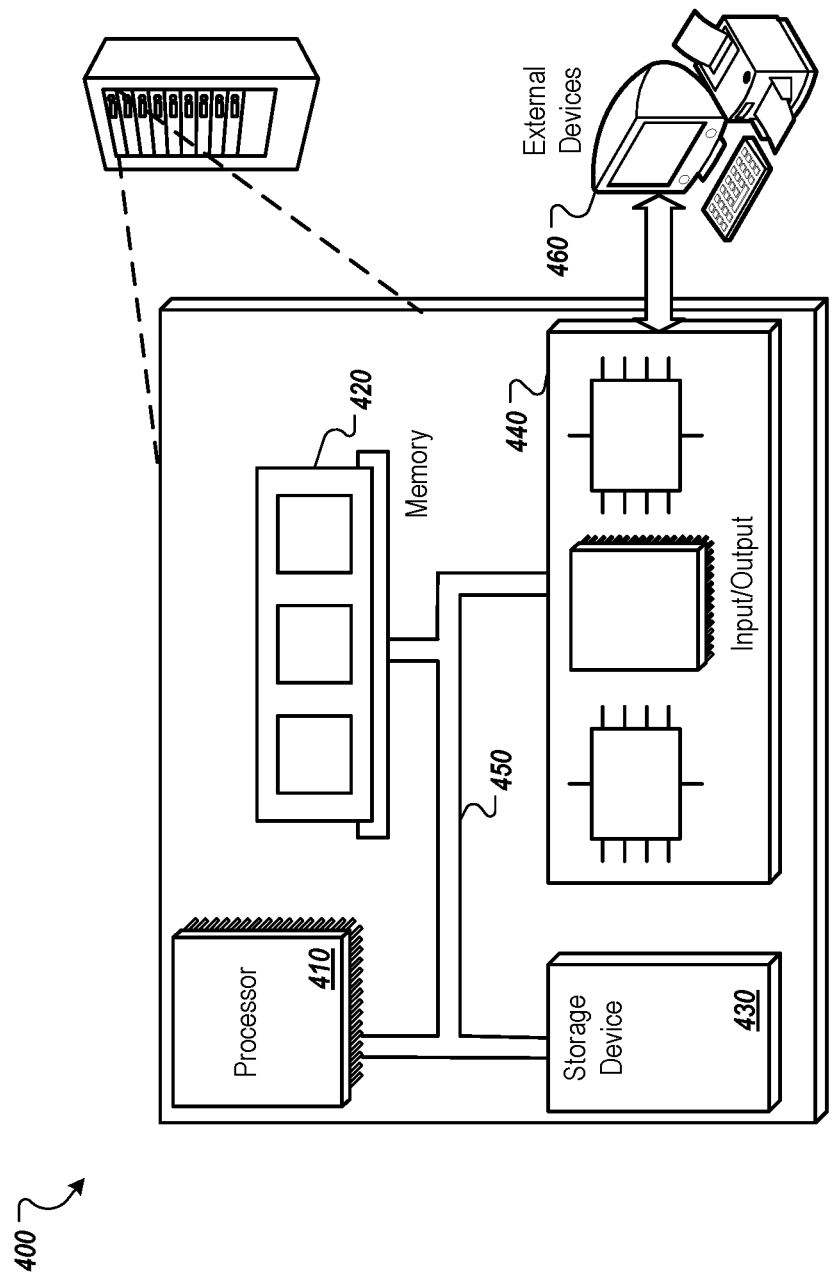
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In addition to the embodiments described above, the following embodiments are also innovative:

Embodiment 1 is a method including determining, for a given domain, engagement by a user with content provided by the given domain for display by an application at a client device of the user; determining, based on the engagement by the user, to extend, for the given domain, a linkage between user identifiers for a user of the application; in response to determining to extend, for the given domain, the linkage between the user identifiers for the user of the application: obtaining one or more future domain-specific ephemeral user identifiers for the user and the given domain, wherein each future domain-specific ephemeral user identifier is a user identifier that the application will use to identify the user to the given domain during a future time period after a current time period lapses; generating an attestation record comprising: a set of data comprising payload data; a digital signature of the set of data; a current domain-specific ephemeral user identifier for the user and the given domain; and the one or more future domain-specific ephemeral user identifiers for the user and the given domain; and sending the attestation record to the given domain.

Embodiment 2 is the method of embodiment 1, wherein the set of data comprises a timestamp indicating a time at which the attestation record is generated and a signed redemption record.

Embodiment 3 is the method of embodiment 1 or 2, wherein the payload data comprises the one or more future domain-specific user identifiers for the user and the given domain Embodiment 4 is the method of any one of embodiments 1-3, wherein the engagement by the user comprises a level of user engagement by the user with the content provided by the given domain for display by the application at the client device of the user, the method further comprising selecting a quantity of the one or more future domain-specific user identifiers for the user and the given domain based on the level of user engagement for the given domain.

Embodiment 5 is the method of any one of embodiments 1-4, wherein the current domain-specific user identifier and the one of more future domain-specific user identifiers are encrypted using an encryption key of the given domain.

Embodiment 6 is the method of any one of embodiments 1-5, wherein the attestation record comprises, for each of multiple domains including the given domain, a respective current user identifier for the domain.

Embodiment 7 is the method of any one of embodiments 1-6, wherein: the current domain-specific ephemeral user identifier for the user and the given domain comprises a current public key for the user and the given domain; and each of the one or more future domain-specific user identifiers comprises a future public key for the user and the given domain Embodiment 8 is the method of any one of embodiments 1-7, wherein: the given domain is a domain of a publisher of electronic resources; and determining, for the given domain, the user engagement by the user with content provided by the given domain for display by the application at the client device of the user comprises determining a level of user engagement based on the user navigating to an electronic resource of the publisher.

Embodiment 9 is the method of any one of embodiments 1-7, wherein: the given domain is a domain of a content platform that distributes digital components or of a content platform that facilitates distribution of digital components by another content platform; and determining, for the given domain, the engagement by the user with content provided by the given domain for display by the application at the client device of the user comprises determining a level of user engagement based on the content platform providing one or more digital components for presentation at the client device.

Embodiment 10 is the method of any one of embodiments 1-7, wherein: the given domain is a domain of a digital component provider that creates digital components that include content of the digital component provider; and determining, for the given domain, the engagement by the user with content provided by the given domain for display by the application at the client device of the user comprises determining a level of user engagement based on the user interacting with a digital component created by the digital component provider.

Embodiment 11 is a system comprising: one or more processors; and one or more storage devices storing instructions that, when executed by the one or more processors, cause the one or more processor to carry out the method of any of embodiments 1 to 10.

Embodiment 12 is a computer readable storage medium carrying instructions that, when executed by one or more processors, cause the one or more processors to carry out the method of any one of embodiments 1 to 10.

Embodiment 13 is a computer program product comprising instructions which, when executed by a computer, cause the computer to carry out the steps of the method of any of embodiments 1 to 10.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    determining, for a given domain, engagement by a user with content provided by the given domain for display by an application at a client device of the user;
    determining, based on the engagement by the user, to extend, for the given domain, a linkage between different user identifiers for a user of the application for a duration of time such that the given domain is capable of identifying the user using any of the different user identifiers during the duration of time;
    in response to determining to extend, for the given domain, the linkage between the user identifiers for the user of the application for the duration of time:
        obtaining one or more future domain-specific ephemeral user identifiers for the user and the given domain, wherein each future domain-specific ephemeral user identifier is a user identifier that the application will use to identify the user to the given domain during a future time period after a current time period lapses;
        generating an attestation record comprising:
            a set of data comprising payload data;
            a digital signature of the set of data;
            a current domain-specific ephemeral user identifier for the user and the given domain; and
            the one or more future domain-specific ephemeral user identifiers for the user and the given domain; and
        sending the attestation record to the given domain.

2. The computer-implemented method of claim 1, wherein the set of data comprises a timestamp indicating a time at which the attestation record is generated and a signed redemption record.

3. The computer-implemented method of claim 1, wherein the payload data comprises the one or more future domain-specific user identifiers for the user and the given domain.

4. The computer-implemented method of claim 1, wherein the engagement by the user comprises a level of user engagement by the user with the content provided by the given domain for display by the application at the client device of the user, the method further comprising selecting a quantity of the one or more future domain-specific user identifiers for the user and the given domain based on the level of user engagement for the given domain.

5. The computer-implemented method of claim 1, wherein the current domain-specific user identifier and the one of more future domain-specific user identifiers are encrypted using an encryption key of the given domain.

6. The computer-implemented method of claim 1, wherein the attestation record comprises, for each of multiple domains including the given domain, a respective current user identifier for the domain.

7. The computer-implemented method of claim 1, wherein:
    the current domain-specific ephemeral user identifier for the user and the given domain comprises a current public key for the user and the given domain; and
    each of the one or more future domain-specific user identifiers comprises a future public key for the user and the given domain.

8. The computer-implemented method of claim 1, wherein:
    the given domain is a domain of a publisher of electronic resources; and
    determining, for the given domain, the user engagement by the user with content provided by the given domain for display by the application at the client device of the user comprises determining a level of user engagement based on the user navigating to an electronic resource of the publisher.

9. The computer-implemented method of claim 1, wherein:
    the given domain is a domain of a content platform that distributes digital components or of a content platform that facilitates distribution of digital components by another content platform; and
    determining, for the given domain, the engagement by the user with content provided by the given domain for display by the application at the client device of the user comprises determining a level of user engagement based on the content platform providing one or more digital components for presentation at the client device.

10. The computer-implemented method of claim 1, wherein:
    the given domain is a domain of a digital component provider that creates digital components that include content of the digital component provider; and
    determining, for the given domain, the engagement by the user with content provided by the given domain for display by the application at the client device of the user comprises determining a level of user engagement based on the user interacting with a digital component created by the digital component provider.

11. A system comprising:
    one or more processors; and
    one or more storage devices storing instructions that, when executed by the one or more processors, cause the one or more processor to perform operations comprising:
        determining, for a given domain, engagement by a user with content provided by the given domain for display by an application at a client device of the user;
        determining, based on the engagement by the user, to extend, for the given domain, a linkage between different user identifiers for a user of the application for a duration of time such that the given domain is capable of identifying the user using any of the different user identifiers during the duration of time;
        in response to determining to extend, for the given domain, the linkage between the user identifiers for the user of the application for the duration of time:
            obtaining one or more future domain-specific ephemeral user identifiers for the user and the given domain, wherein each future domain-specific ephemeral user identifier is a user identifier that the application will use to identify the user to the given domain during a future time period after a current time period lapses;

generating an attestation record comprising:
a set of data comprising payload data;
a digital signature of the set of data;
a current domain-specific ephemeral user identifier for the user and the given domain; and
the one or more future domain-specific ephemeral user identifiers for the user and the given domain; and sending the attestation record to the given domain.

12. The system of claim 11, wherein the set of data comprises a timestamp indicating a time at which the attestation record is generated and a signed redemption record.

13. The system of claim 11, wherein the payload data comprises the one or more future domain-specific user identifiers for the user and the given domain.

14. The system of claim 11, wherein the engagement by the user comprises a level of user engagement by the user with the content provided by the given domain for display by the application at the client device of the user, the operations further comprising selecting a quantity of the one or more future domain-specific user identifiers for the user and the given domain based on the level of user engagement for the given domain.

15. The system of claim 11, wherein the current domain-specific user identifier and the one of more future domain-specific user identifiers are encrypted using an encryption key of the given domain.

16. The system of claim 11, wherein the attestation record comprises, for each of multiple domains including the given domain, a respective current user identifier for the domain.

17. The system of claim 11, wherein:
the current domain-specific ephemeral user identifier for the user and the given domain comprises a current public key for the user and the given domain; and
each of the one or more future domain-specific user identifiers comprises a future public key for the user and the given domain.

18. The system of claim 11, wherein:
the given domain is a domain of a publisher of electronic resources; and
determining, for the given domain, the user engagement by the user with content provided by the given domain for display by the application at the client device of the user comprises determining a level of user engagement based on the user navigating to an electronic resource of the publisher.

19. The system of claim 11, wherein:
the given domain is a domain of a content platform that distributes digital components or of a content platform that facilitates distribution of digital components by another content platform; and
determining, for the given domain, the engagement by the user with content provided by the given domain for display by the application at the client device of the user comprises determining a level of user engagement based on the content platform providing one or more digital components for presentation at the client device.

20. A non-transitory computer readable storage medium carrying instructions that, when executed by one or more processors, cause the one or more processors to perform operations comprising:
determining, for a given domain, engagement by a user with content provided by the given domain for display by an application at a client device of the user;
determining, based on the engagement by the user, to extend, for the given domain, a linkage between different user identifiers for a user of the application for a duration of time such that the given domain is capable of identifying the user using any of the different user identifiers during the duration of time;
in response to determining to extend, for the given domain, the linkage between the user identifiers for the user of the application for the duration of time:
obtaining one or more future domain-specific ephemeral user identifiers for the user and the given domain, wherein each future domain-specific ephemeral user identifier is a user identifier that the application will use to identify the user to the given domain during a future time period after a current time period lapses;
generating an attestation record comprising:
a set of data comprising payload data;
a digital signature of the set of data;
a current domain-specific ephemeral user identifier for the user and the given domain; and
the one or more future domain-specific ephemeral user identifiers for the user and the given domain; and
sending the attestation record to the given domain.

* * * * *